United States Patent [19]
Lin

[11] Patent Number: 5,758,866
[45] Date of Patent: Jun. 2, 1998

[54] QUICK CONNECTOR

[76] Inventor: Ying-Feng Lin, No. 25, Lane 50, Sec. 3, Chung-Hsiao Rd., Sanchung City, Taipei County, Taiwan

[21] Appl. No.: 706,464

[22] Filed: Sep. 4, 1996

[51] Int. Cl.[6] .................................. F16K 51/00
[52] U.S. Cl. .................. 251/149.8; 251/343; 137/315
[58] Field of Search .................. 251/149.8, 343, 251/347; 137/614.05, 315

[56] References Cited

U.S. PATENT DOCUMENTS

| 3,500,859 | 3/1970 | Pearson | 251/149.8 |
| 4,856,756 | 8/1989 | Combs | 251/343 |

FOREIGN PATENT DOCUMENTS

| 2239642 | 2/1975 | France | 251/149.8 |
| 2284254 | 4/1976 | France | 251/343 |
| 2520669 | 11/1976 | Germany | 251/149.8 |

*Primary Examiner*—Demse L. Ferensic
*Assistant Examiner*—John Ball
*Attorney, Agent, or Firm*—Morton J. Rosenberg; David I. Klein; Jun Y. Lee

[57] ABSTRACT

A quick connector including a casing, a coupling member mounted in the casing, a control member fastened to the casing at one end through a screw joint and turned to close/open the air passage through the coupling member, a first connector fastened to the control member through a screw joint and adapted for connecting to the air hose of an air compressor, and a second connector fastened to the casing at an opposite end and secured in place by steel balls through the control of a spring-supported shell around the casing and adapted for connecting to a pneumatic tool.

1 Claim, 6 Drawing Sheets

5,758,866

1

QUICK CONNECTOR

BACKGROUND OF THE INVENTION

The present invention relates to quick connectors, and relates more specifically to a quick connector adapted for connecting the air hose of an air compressor to a pneumatic tool.

FIGS. 5 and 6 show a quick connector for connection between an air compressor and a pneumatic tool. This structure of quick connector comprises a casing 6, a release control mechanism 61 mounted around the front end of the casing 6, a first connector 7' having a threaded coupling end 71' threaded into an inner thread 62 at the rear end of the casing, a movable member 64 inserted into the center hole defined within an inside annular flange 63 inside the casing 6, a second connector 5' coupled to the casing 6. The release control mechanism 61 is comprised of a shell, a spring, and a plurality of steel balls. The second connector 5' has a coupling end 51' inserted into the front end of the casing 6, and an annular groove 52' around the periphery adapted for engaging with the steel balls of the release control mechanism 61. The movable guide member 64 is a stepped tube, having a receptacle 65 at the front end adapted for receiving the coupling end 51' of the second connector 5', and a plurality of radial through holes 66 spaced around the rear end. Further, a spring 67 is mounted in the recessed rear end of the movable guide member 64, and stopped against a step inside the first connector 7' This structure of quick connector is still not satisfactory in function. If to disconnect the quick connector from the pneumatic tool after its installation, compressed air may escape out of the quick connector suddenly, causing the pneumatic tool or the parts of the quick connector to jump away. Therefore, disconnecting the pneumatic tool from the quick connector must be carefully performed, or an accident may occur. Because the movable guide member is forced forwards by the spring and the pressure of compressed air, much effort must be employed to move the movable guide member backwards for the installation of the second connector.

SUMMARY OF THE INVENTION

The present invention has been accomplished to provide a quick connector which eliminates the aforesaid drawbacks. It is one object of the present invention to provide a quick connector which has a simple structure, and is inexpensive to manufacture. It is another object of the present invention to provide a quick connector which can be conveniently operated to close/open the air passage for quick installation. It is still another object of the present invention to provide a quick connector which is safe in use. According to the present invention, the quick connector comprises a casing, a coupling member mounted in the casing, a control member fastened to the casing at one end through a screw joint and turned to close/open the air passage through the coupling member, a first connector fastened to the control member through a screw joint and adapted for connecting to the air hose of an air compressor, and a second connector fastened to the casing at an opposite end and secured in place by steel balls through the control of a spring-supported shell around the casing and adapted for connecting to a pneumatic tool.

2

Figure 1:
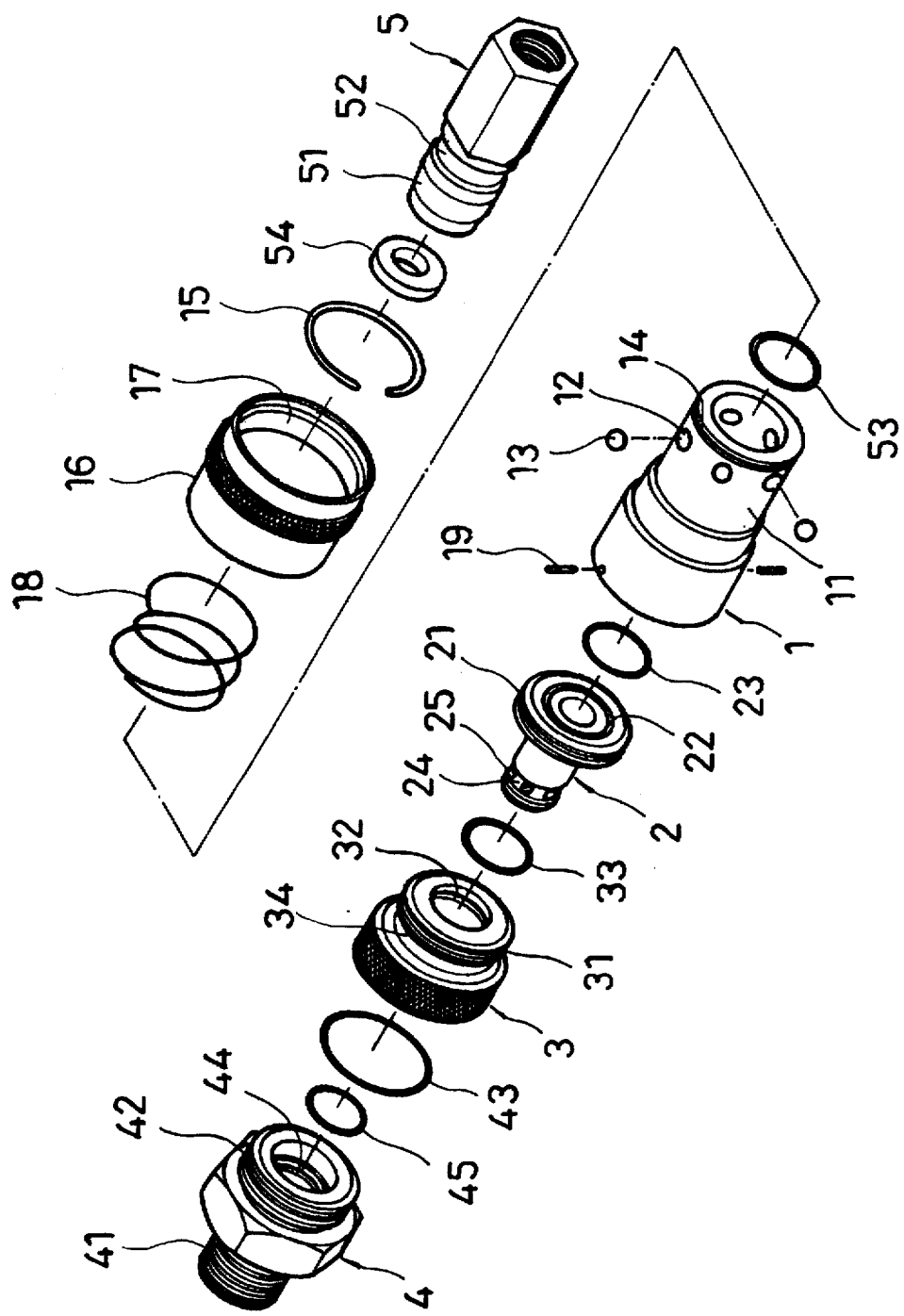
FIG. 1 is an exploded view of a quick connector according to the present invention.
Figure 2:
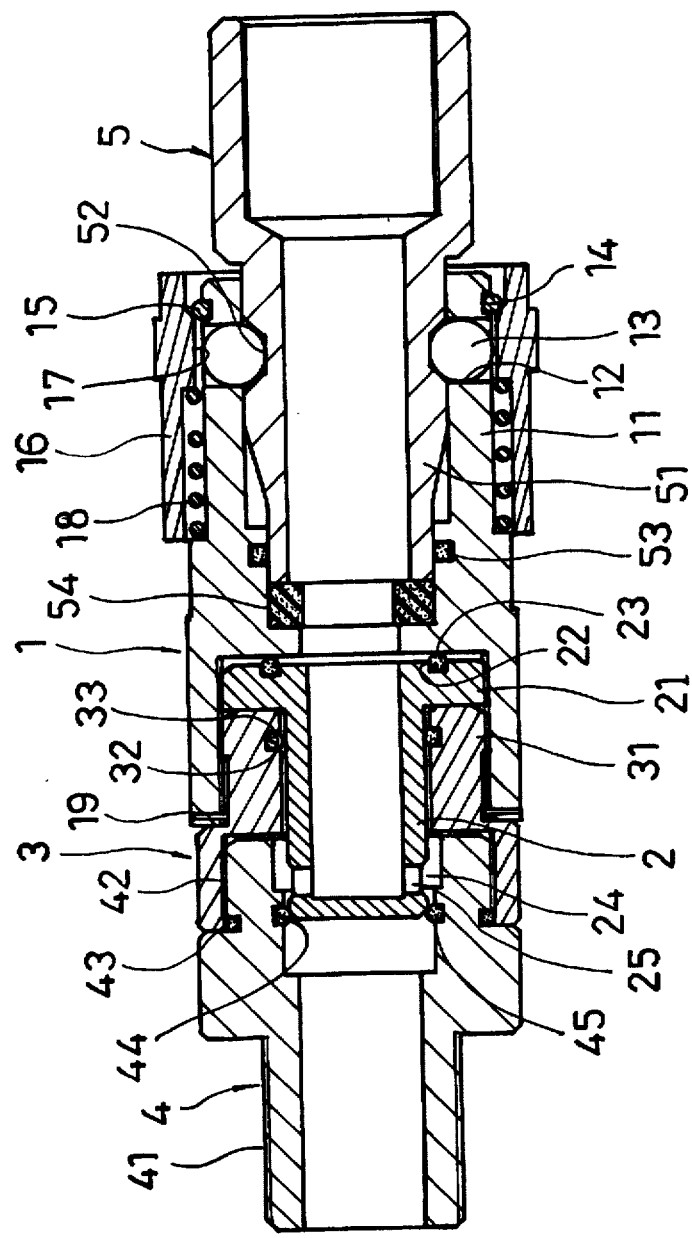
FIG. 2 is a sectional assembly view of the present invention, showing the air passage closed.
Figure 3:
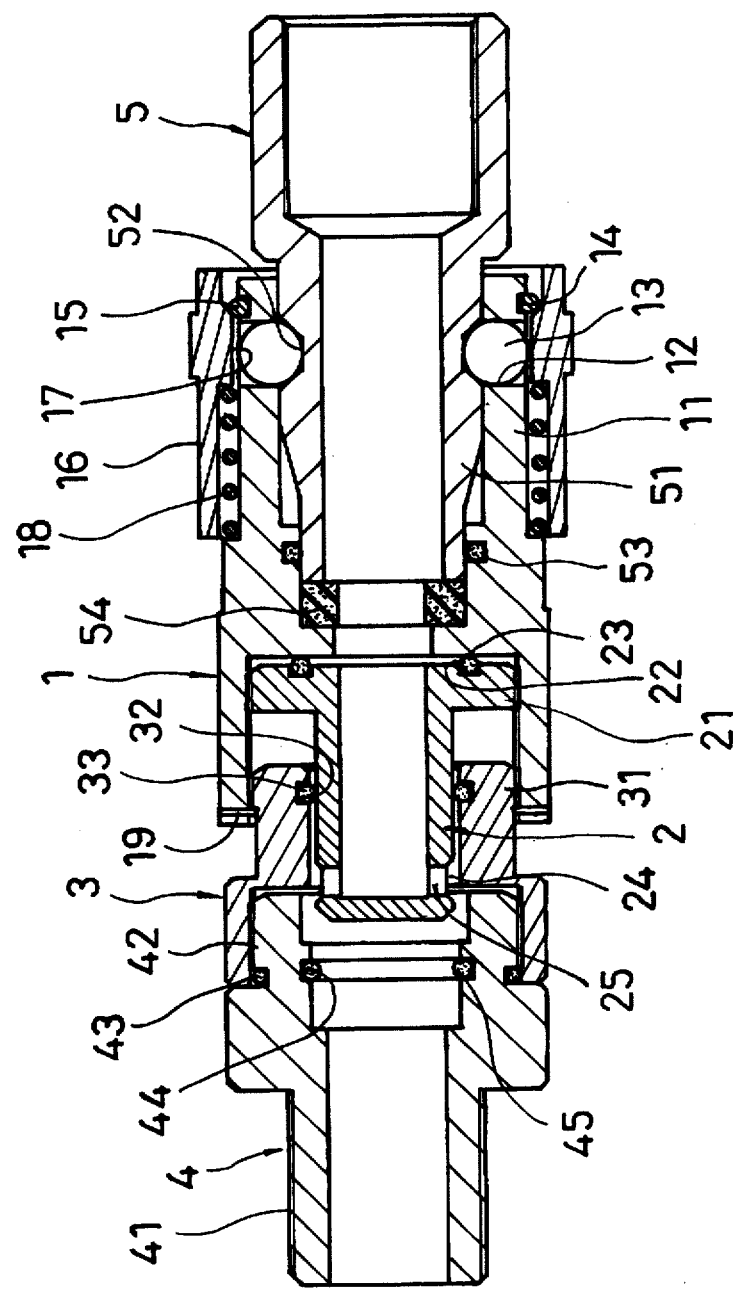
Figure 4:
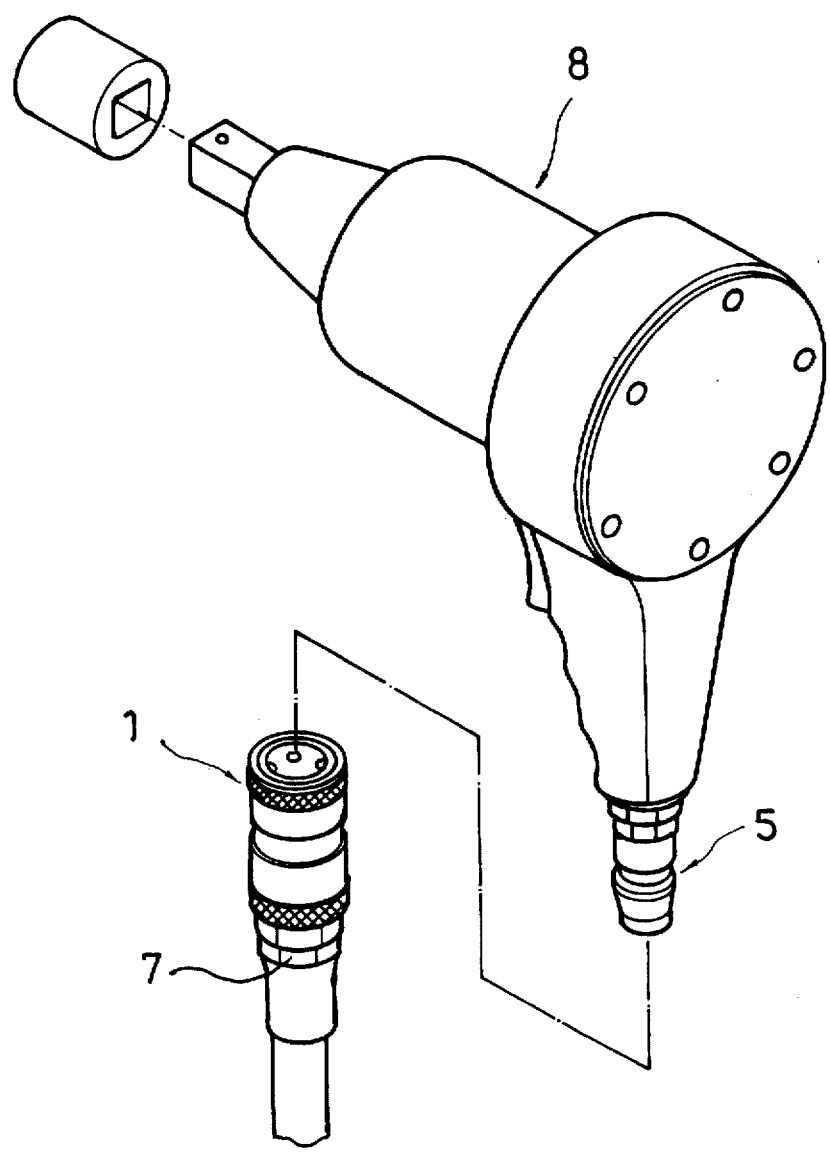
Figure 5:
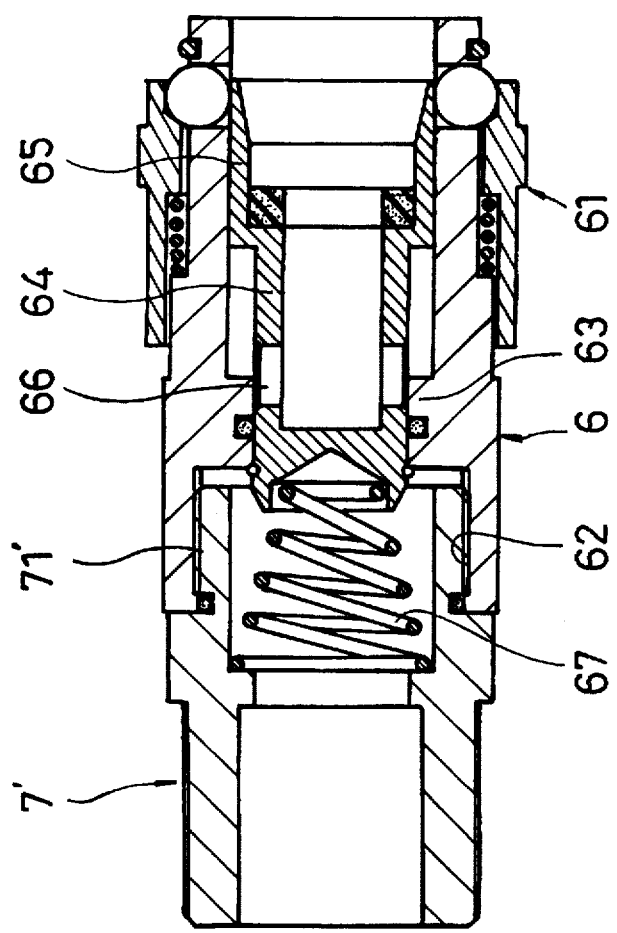
Figure 6:
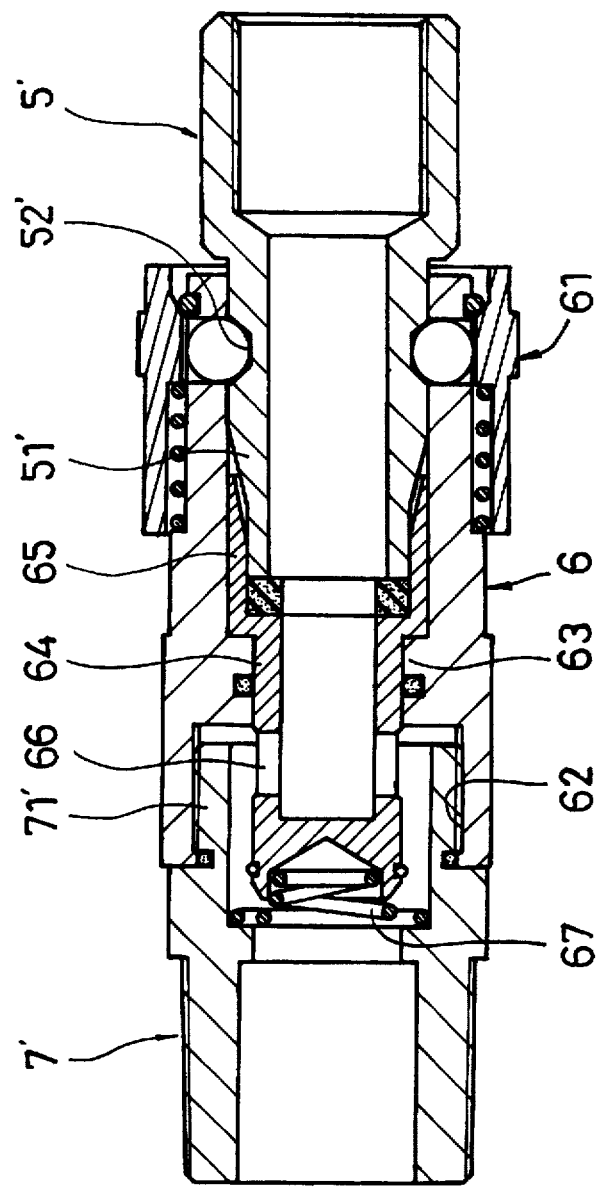

FIG. 3 is similar to FIG. 2 but showing the air passage opened;

FIG. 4 is an applied view of the present invention, showing the second connector connected to a pneumatic tool, the first connector connected to a connector at one end of an air hose;

FIG. 5 is a sectional view of a quick connector according to the prior art (before the connection of the second connector); and FIG. 6 is another sectional view of the quick connector shown in FIG. 5, showing the second connector connected, the spring compressed.

DETAILED DESCRIPTION OF THE PREFERRED EMBODIMENT

Referring to Figures from 1 to 4, a quick connector in accordance with the present invention is generally comprised of a cylindrical casing 1, a coupling member 2, a control member 3, a first connector 4, and a second connector 5.

The casing 1 comprises a reduced coupling portion 11 at the front end, a plurality of radial through holes 12 equiangularly spaced around the reduced coupling portion 11 which receive a respective steel ball 13, an outside annular groove 14 around the reduced coupling portion 11 in front of the radial through holes 12. A shell 16 is mounted around the reduced coupling portion 11, having an inside annular flange 17. A spring 18 is mounted around the casing 1 and connected between the casing 1 and the shell 16, imparting a forward pressure to the shell 16. A clamp 15 is fastened to the annular groove 14 to limit the forward movement of the shell 16. Normally, the shell 16 is pushed forwards by the spring 18, causing the inside annular flange 17 to force the steel balls 13 inwards, and therefore the steel balls 13 are forced to project into the inner diameter of the casing 1. When the shell 16 is pushed backwards against the spring 18, the steel balls 13 are released from the constraint of the inside annular flange 17 of the shell 16. The rear end of the casing 1 is internally threaded, and mounted with two opposite locating pins 19. The coupling member 2 is a hollow cylindrical member mounted in the casing 1, having a threaded head 21 at the front end threaded into the internally threaded rear end of the casing 1, an annular groove 22 at the front side of the head 21, an oil seal ring 23 mounted in the annular groove 22, a neck 24 at the rear end, and a plurality of radial air holes 25 equiangularly spaced around the neck 24. When the coupling member 2 is fastened to the casing 1, the oil seal ring 23 is stopped at the flanged inside wall the casing 1, and therefore compressed air is confined to pass from the casing 1 out of the coupling member 2 through the radial air holes 25 of the coupling member 2. The control member 3 is shaped like a stepped tube, comprising a coupling neck 31 at the front end mounted around the coupling member 2 and fastened to the rear end of the casing 1. The coupling neck 31 of the control member 3 has an outer thread 34 threaded into the internally threaded rear end of the casing 1, an inside annular groove 32, and an oil seal ring 33 mounted in the inside annular groove 32 around the periphery of the coupling member 2. When the outer thread 34 of the control member 3 is threaded into the internally threaded rear end of the casing 1, the locating pins 19 are respectively and inwardly forced into engagement with the outer thread 34 of the coupling neck 31 of the control member 3, to stop the control member 3 from escaping out of the casing 1. The rear end of the control member 3 is internally threaded for the connection of the first connector 4. The first connector 4 is a hollow screw member having a threaded rear coupling end 41 adapted for connecting to a connector 7 at one end of the air hose of an air compressor (see FIG. 4), a threaded front coupling end 42 threaded into the internally threaded rear end of the control member 3 and spaced around the neck 24 of the coupling member 2, an inside annular groove 44, an inner oil seal ring 45 mounted in the inside annular groove 44 and moved with the first connector 4 to close/open the air passage between the rear end of the coupling member 2 and the inside wall of the first connector 4, and an outer oil seal ring 43 mounted around the threaded front coupling end 42 within the control member 3. When the control member 4 is turned forwards and stopped at the head 21 of the coupling member 2, the inner oil seal ring 45 is forced into engagement with the rear end of the coupling member 2, thereby causing the air passage to be stopped, i.e., compressed air is prohibited from passing through the radial air holes 25 of the coupling member 2. On the contrary, when the control member 4 is turned backwards and disconnected from the head 21 of the coupling member 2, the inner oil seal ring 45 is released from the rear end of the coupling member 2, therefore the air passage is opened for permitting compressed air to pass from the first connector 4 through the radial air holes 25 of the coupling member 2 to the inside of the casing 1. The second connector 5 is fastened to the air input end of a pneumatic tool 8, having a coupling end 51 adapted for coupling to the reduced coupling portion 11 of the casing 1, and an outside annular groove 52 around the coupling end 51.

When the quick connector is assembled, the first connector 4 and the control member 3 are fastened tight to close the radial air holes 25, then the shell 16 is pulled backwards to release the steel balls 13 for permitting the coupling end 51 of the second connector 5 to be inserted into the front end of the casing 1. When the coupling end 51 of the second connector 5 is inserted into the front end of the casing 1, the shell 16 is released. When the shell 16 is released, it immediately pushed forwards by the spring 18, thereby causing the steel balls 13 to be forced inwards by the inside annular flange 17 of the shell 16 into engagement with the outside annular groove 52 of the second connector 5, and therefore the second connector 5 is connected to the casing 1 (see FIG. 2). When installed, the control member 3 is turned backwards to release the inner oil seal ring 45 from the rear end of the coupling member 2, so as to open the radial air holes 25, for permitting compressed air to pass from the air compressor to the pneumatic tool 8 through the quick connector.

While only one embodiment of the present invention has been shown and described, it will be understood that various modifications and changes could be made thereunto without departing from the spirit and scope of the invention disclosed.

What the invention claimed is:

1. A quick connector for connection between a pneumatic tool and a compressed air source for permitting compressed air to be forced from said compressed air source to said pneumatic tool, comprising:

a casing, said casing comprising a reduced coupling portion at a front end thereof, an internally threaded rear end, two locating pins respectively mounted in a respective pin hole in the internally threaded rear end of said casing, a plurality of radial through holes equiangularly spaced around said reduced coupling portion, a plurality of steel balls respectively mounted in said radial through holes, an outside annular groove around said reduced coupling portion in front of said radial through holes, a shell mounted around said reduced coupling portion and having an inside annular flange adapted for forcing said steel balls inwards in said radial through holes, a spring mounted around said casing and connected between said casing and said shell to impart a forward pressure to said shell, a clamp fastened to the annular groove of said reduced coupling portion to limit the forward movement of said shell;

a tubular coupling member mounted in the rear end of said casing, said coupling member comprising a threaded head at a front end thereof threaded into the internally threaded rear end of said casing, an annular groove at a front side of said head, an oil seal ring mounted in the annular groove of said head and stopped inside said casing, a neck at a rear end thereof, and a plurality of radial air holes equiangularly spaced around the neck of said coupling member;

a tubular control member mounted in the rear end of said casing around the rear end of said coupling member, said control member comprising a coupling neck at a front end thereof mounted around said coupling member and fastened to the rear end of said casing, and an internally threaded rear end, the coupling neck of said control member having an outer thread threaded into the internally threaded rear end of said casing and disposed in engagement with the locating pins of said casing, an inside annular groove, and an oil seal ring mounted in the inside annular groove of the coupling neck of said control member around the periphery of said coupling member, a first connector connected between said control member and said compressed air source, said first connector comprising a threaded rear coupling end connected to said compressed air source, a threaded front coupling end threaded into the internally threaded rear end of said control member and spaced around the neck of said coupling member, an inside annular groove, an inner oil seal ring mounted in the inside annular groove of said first connector and moved with said first connector between a first position in which the air passage through the radial air holes of said coupling member is closed, and a second position in which the air passage through the radial air holes of said coupling member is opened, and an outer oil seal ring mounted around the threaded front coupling end of said first connector within said control member; and a second connector connected between said casing and said pneumatic tool, said second connector having a coupling end inserted into the reduced coupling portion of said casing, and an outside annular groove around the coupling end of said second connector for engagement with said steel balls.

* * * * *